US012288636B2

(12) United States Patent
Otani et al.

(10) Patent No.: US 12,288,636 B2
(45) Date of Patent: Apr. 29, 2025

(54) ELECTRONIC COMPONENT AND METHOD FOR MANUFACTURING THE SAME

(71) Applicant: Murata Manufacturing Co., Ltd., Kyoto-fu (JP)

(72) Inventors: Shinji Otani, Nagaokakyo (JP); Hiroki Imaeda, Nagaokakyo (JP); Namiko Sasajima, Nagaokakyo (JP); Tomohiro Sunaga, Nagaokakyo (JP); Masami Okado, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 712 days.

(21) Appl. No.: 17/371,693

(22) Filed: Jul. 9, 2021

(65) Prior Publication Data

US 2022/0020524 A1 Jan. 20, 2022

(30) Foreign Application Priority Data

Jul. 16, 2020 (JP) ................................ 2020-122354

(51) Int. Cl.
*H01F 27/28* (2006.01)
*H01F 27/25* (2006.01)
*H01F 27/255* (2006.01)
*H01F 41/04* (2006.01)

(52) U.S. Cl.
CPC ....... *H01F 27/2804* (2013.01); *H01F 27/255* (2013.01); *H01F 41/041* (2013.01)

(58) Field of Classification Search
CPC ... H01F 27/2804; H01F 27/255; H01F 41/041
See application file for complete search history.

(56) References Cited

U.S. PATENT DOCUMENTS

| | | | | |
|---|---|---|---|---|
| 2014/0145814 A1* | 5/2014 | Lee | H01F 17/0013 | 336/200 |
| 2016/0035476 A1* | 2/2016 | Mimura | H01F 41/046 | 336/199 |
| 2016/0314890 A1* | 10/2016 | Kitajima | H01F 17/0033 | |
| 2017/0169930 A1* | 6/2017 | Kudo | H01F 17/0013 | |
| 2017/0200554 A1* | 7/2017 | Kudo | H01F 27/36 | |
| 2018/0033540 A1* | 2/2018 | Lee | H01F 41/041 | |
| 2018/0061553 A1* | 3/2018 | Jeon | H01F 17/04 | |

(Continued)

FOREIGN PATENT DOCUMENTS

| | | |
|---|---|---|
| CN | 107039140 A | 8/2017 |
| JP | 2016-032050 A | 3/2016 |

(Continued)

*Primary Examiner* — Malcolm Barnes
(74) *Attorney, Agent, or Firm* — Studebaker Brackett PLLC

(57) ABSTRACT

An electronic component includes a composite body containing resin and magnetic metal particles, a first metal film provided on an outer surface of the composite body, and a second metal film provided on the first metal film. At least one of the magnetic metal particles is exposed at a contact surface of the composite body that is in contact with the first metal film. The first metal film is in contact with an exposed surface of the at least one of the magnetic metal particles exposed from the contact surface. The film thickness of the first metal film on the exposed surface is 2.9 μm or more.

18 Claims, 5 Drawing Sheets

(56) References Cited

U.S. PATENT DOCUMENTS

| | | | | |
|---|---|---|---|---|
| 2018/0137965 A1* | 5/2018 | Lee | ..................... | H01F 17/0033 |
| 2018/0182539 A1* | 6/2018 | Muneuchi | ............... | H01F 17/04 |
| 2019/0115150 A1* | 4/2019 | Yoshioka | .............. | H01F 41/046 |
| 2020/0168391 A1* | 5/2020 | Yang | ................... | H01F 17/0013 |
| 2021/0202154 A1* | 7/2021 | Wakabayashi | .......... | H01F 27/32 |

FOREIGN PATENT DOCUMENTS

| | | |
|---|---|---|
| JP | 2017-103423 A | 6/2017 |
| JP | 2017-123406 A | 7/2017 |
| JP | 2019-075478 A | 5/2019 |

* cited by examiner

ELECTRONIC COMPONENT AND METHOD FOR MANUFACTURING THE SAME

CROSS-REFERENCE TO RELATED APPLICATION

This application claims benefit of priority to Japanese Patent Application No. 2020-122354, filed Jul. 16, 2020, the entire content of which is incorporated herein by reference.

BACKGROUND

Technical Field

The present disclosure relates to an electronic component and a method for manufacturing the same.

Background Art

A known electronic component is described in Japanese Unexamined Patent Application Publication No. 2017-103423. The electronic component described in Japanese Unexamined Patent Application Publication No. 2017-103423 includes a composite body made of a composite material of resin and a magnetic metal powder and a metal film provided on an outer surface of the composite body.

SUMMARY

It has been found that, in a case where the electronic component is covered with another metal film, a crack may appear in part of the metal film. Furthermore, intensive investigations have revealed that the magnetic metal powder is dissolved in such case.

Accordingly, the present disclosure provides an electronic component in which the dissolution of magnetic metal particles is suppressed.

According to a preferred embodiment of the present disclosure, an electronic component includes a composite body containing resin and magnetic metal particles, a first metal film provided on an outer surface of the composite body, and a second metal film provided on the first metal film. At least one of the magnetic metal particles is exposed at a contact surface of the composite body that is in contact with the first metal film. The first metal film is in contact with an exposed surface of the at least one of the magnetic metal particles exposed from the contact surface. A film thickness of the first metal film on the exposed surface is 2.9 μm or more.

According to the above embodiment, in the contact surface of the composite body, pinholes are unlikely to occur in the first metal film on the exposed magnetic metal particles. As a result, the dissolution of the magnetic metal particles can be suppressed.

The term "film thickness of the first metal film" as used herein refers to the film thickness of the first metal film in a direction perpendicular to a surface which is one of outer surfaces of the composite body and on which the first metal film is provided.

According to another preferred embodiment of the present disclosure, a method for manufacturing an electronic component includes forming an exposed surface of at least one of magnetic metal particles on an outer surface of a composite body containing resin and the magnetic metal particles, forming a first metal film on the exposed surface by electroless plating such that a film thickness of the first metal film is 2.9 μm or more, and forming a second metal film on the first metal film.

According to this embodiment, on the magnetic metal particles exposed at a contact surface of the composite body that is in contact with the first metal film, pinholes are unlikely to occur in the first metal film on the exposed magnetic metal particles. As a result, an electronic component having good performance can be manufactured.

In accordance with an electronic component according to an embodiment of the present disclosure and a method for manufacturing the same according to an embodiment of the present disclosure, an electronic component having good performance can be provided.

Other features, elements, characteristics and advantages of the present disclosure will become more apparent from the following detailed description of preferred embodiments of the present disclosure with reference to the attached drawings.

DETAILED DESCRIPTION

Electronic components according to embodiments of the present disclosure are described below in detail with reference to the attached drawings. The drawings include partly schematic views and do not reflect actual sizes in some cases.

First Embodiment

Configuration

Figure 1A:
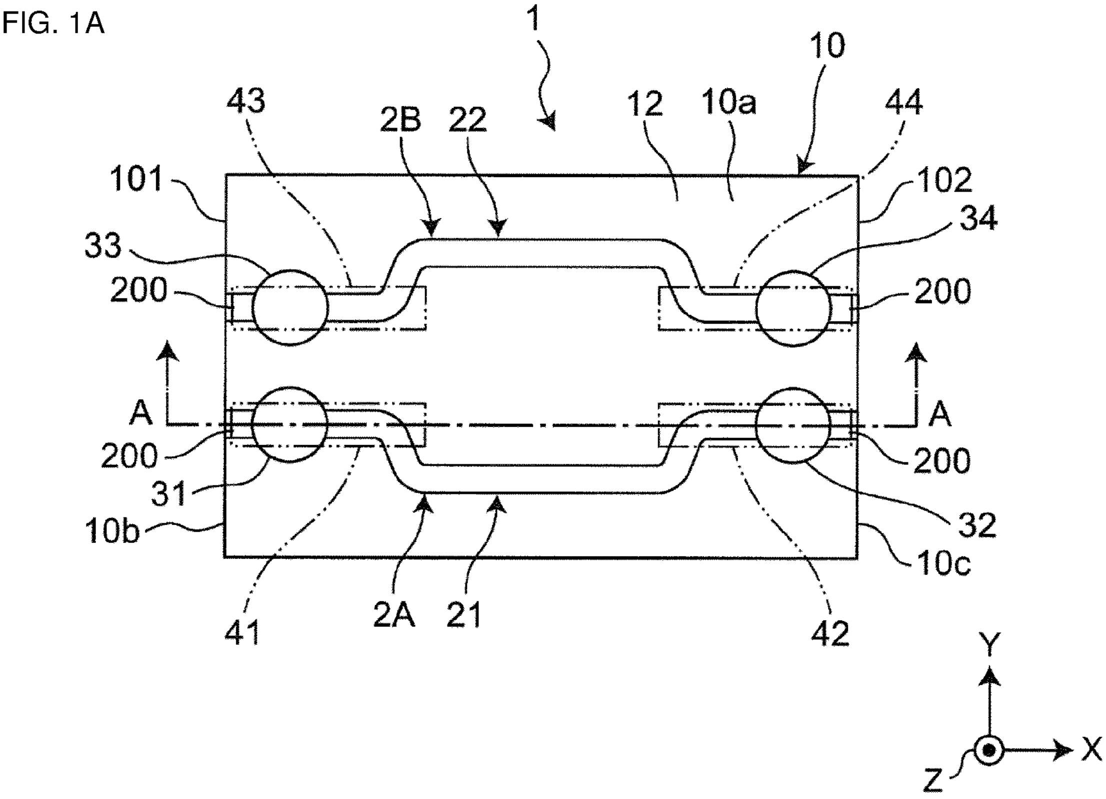
FIG. 1A is a perspective plan view of an electronic component according to a first embodiment, the electronic component being an inductor component.
Figure 1B:
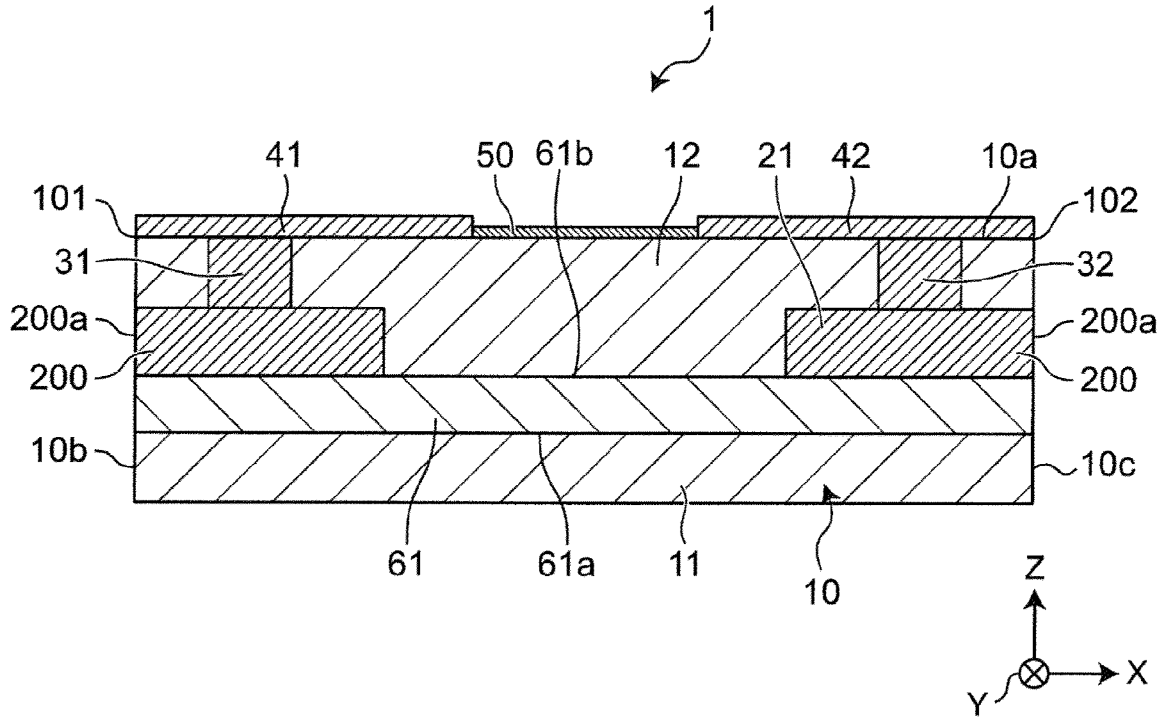
FIG. 1B is a sectional view taken along the line A-A of FIG. 1A.
Figure 2:
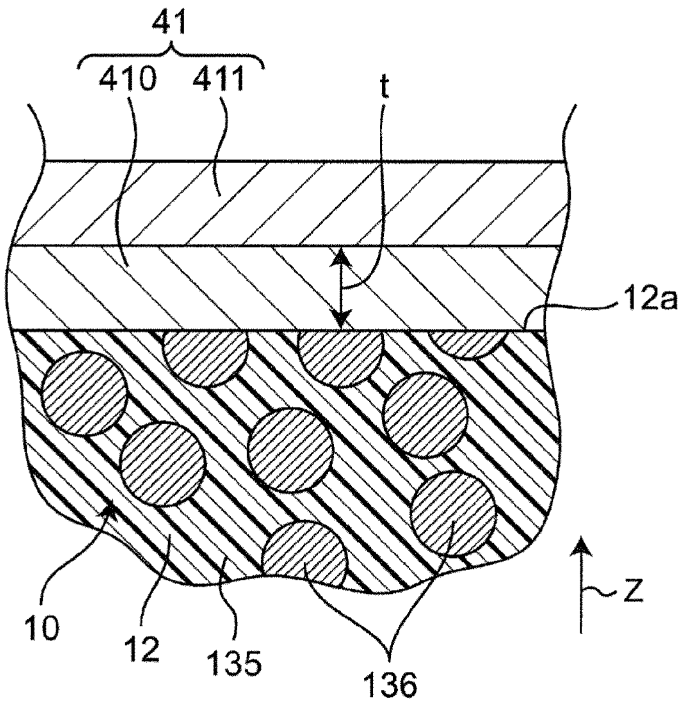
FIG. 2 is a partly enlarged view of FIG. 1B.

FIG. 1A is a perspective plan view of an electronic component according to a first embodiment. FIG. 1B is a sectional view taken along the line A-A of FIG. 1A. FIG. 2 is a partly enlarged view of FIG. 1B.

The electronic component is, for example, an inductor component 1. The inductor component 1 is, for example, a surface-mount electronic component mounted on a circuit board mounted in an electronic device such as a personal computer, a DVD player, a digital camera, a TV, a mobile phone, or a car electronic system. The inductor component 1 is not limited to such a surface-mount electronic component and may be an embedded electronic component. The inductor component 1 is, for example, a component with substantially a cuboid shape as a whole. The shape of the inductor component 1 is not particularly limited and may be substantially a cylindrical shape, a polygonal column shape, a truncated cone shape, or a prismoid shape.

As illustrated in FIGS. 1A and 1B, the inductor component 1 includes an element body 10 having insulating properties; a first inductor element 2A; a second inductor element 2B, the first and second inductor elements 2A and 2B being provided in the element body 10; a first columnar line 31; a second columnar line 32; a third columnar line 33; a fourth columnar line 34, the first, second, third, and fourth columnar lines 31, 32, 33, and 34 being embedded in the element body 10 so as to have an end surface exposed from a rectangular first principal surface 10*a* of the element body 10; a first external terminal 41; a second external terminal 42; a third external terminal 43; a fourth external terminal 44, the first, second, third, and fourth external terminals 41, 42, 43, and 44 being provided on the first principal surface 10*a* of the element body 10; and an insulating film 50 provided on the first principal surface 10*a* of the element body 10. In FIGS. 1A and 1B, a direction substantially parallel to the thickness of the inductor component 1 is a Z-direction, the positive Z-direction is toward an upper side, and the negative Z-direction is toward a lower side. In a plane substantially perpendicular to the Z-direction, a direction substantially parallel to the length of the inductor component 1 is an X-direction and a direction substantially parallel to the width of the inductor component 1 is a Y-direction.

The element body 10 includes an insulating layer 61, a first magnetic layer 11 provided on the lower surface 61*a* of the insulating layer 61, and a second magnetic layer 12 provided on the upper surface 61*b* of the insulating layer 61. The first principal surface 10*a* of the element body 10 corresponds to the upper surface of the second magnetic layer 12. The element body 10 has a three-layer structure made of the insulating layer 61, the first magnetic layer 11, and the second magnetic layer 12. The element body 10 may have a one-layer structure consisting of a magnetic layer only, a two-layer structure consisting of a magnetic layer and an insulating layer only, or a four or more-layer structure composed of a plurality of magnetic layers and insulating layers.

The insulating layer 61 has insulating properties and has a principal surface with substantially a rectangular shape. The thickness of the insulating layer 61 is, for example, about 10 μm to 100 μm. The insulating layer 61 is preferably, for example, an insulating resin layer made of an epoxy resin or polyimide resin free from a matrix such as a glass cloth from the viewpoint of the reduction of profile. The insulating layer 61 may be a sintered body layer made of a magnetic material such as Ni—Zn ferrite or Mn—Zn ferrite or a nonmagnetic material such as alumina or glass or may be a resin substrate layer containing a base material such as a glass-epoxy composite. When the insulating layer 61 is the sintered body layer, the strength and flatness of the insulating layer 61 can be ensured, thereby enhancing the workability of a laminate on the insulating layer 61. When the insulating layer 61 is the sintered body layer, the insulating layer 61 is preferably polished from the viewpoint of the reduction of profile and is particularly preferably polished from a lower side having no laminate.

The first magnetic layer 11 and the second magnetic layer 12 have high permeability, have a principal surface with substantially a rectangular shape, and contain resin 135 and magnetic metal particles 136 dispersed in the resin 135. That is, the first magnetic layer 11 and the second magnetic layer 12 are composite bodies containing the resin 135 and the magnetic metal particles 136. The resin 135 is, for example, an organic insulating material made of an epoxy resin, bismaleimide, a liquid crystal polymer, polyimide, or the like. The magnetic metal particles 136 preferably contain Fe and may contain a magnetic metal material such as Fe alone, an Fe—Si alloy such as Fe—Si—Cr, an Fe—Co alloy, an Fe alloy such as Ni—Fe, or an amorphous alloy thereof. The average size of the magnetic metal particles 136 is, for example, about 0.1 μm to 5 μm. At the stage of manufacturing the inductor component 1, the average size of the magnetic metal particles 136 can be calculated as a size (D50) corresponding to a cumulative percentage of 50% in a size distribution determined by a laser diffraction/scattering method. The content of the magnetic metal particles 136 in each of the first magnetic layer 11 and the second magnetic layer 12 is preferably about 20% by volume to 70% by volume. When the average size of the magnetic metal particles 136 is about 5 μm or less, direct-current superposition characteristics are enhanced and the core loss at high frequency can be reduced by fine powder.

The first inductor element 2A and the second inductor element 2B include a first inductor wiring 21 and a second inductor wiring 22, respectively, provided substantially in parallel to the first principal surface 10*a* of the element body 10. This enables the first inductor element 2A and the second inductor element 2B to be configured substantially in parallel to the first principal surface 10*a*, thereby enabling the reduction in profile of the inductor component 1. The first inductor wiring 21 and the second inductor wiring 22 are provided on the same plane in the element body 10. In particular, the first inductor wiring 21 and the second inductor wiring 22 are provided only on the upper side of the insulating layer 61, that is, the upper surface 61*b* of the insulating layer 61 and is covered by the second magnetic layer 12.

The first and second inductor wirings 21 and 22 are two-dimensionally wound. In particular, the first and second inductor wirings 21 and 22 have a semi-elliptical arch shape as viewed from the Z-direction. That is, the first and second inductor wirings 21 and 22 are curved lines wound substantially halfway. The first and second inductor wirings 21 and 22 each include a straight portion in an intermediate section. In this application, the term “spiral” of an inductor wiring refers to a two-dimensionally wound curved shape including a spiral shape and includes a curved shape with one turn or less like the first and second inductor wirings 21 and 22. The curved shape may include a partly straight portion.

The thickness of the first and second inductor wirings 21 and 22 is preferably, for example, about 40 μm to 120 μm. In an example, the first and second inductor wirings 21 and 22 have a thickness of about 45 μm, a width of about 40 μm, and an interline space of about 10 μm. The interline space is preferably about 3 μm to 20 μm from the viewpoint of ensuring insulating properties.

The first and second inductor wirings 21 and 22 are made of, for example, an electrically conductive material, that is, a low-electrical resistance metal material such as Cu, Ag, or Au. In this embodiment, the inductor component 1 includes the first and second inductor wirings 21 and 22, which are provided in a single layer only. This enables the reduction in profile of the inductor component 1. The first and second inductor wirings 21 and 22 may be metal films and may have a structure in which an electrically conductive layer made of Cu, Ag, or the like is provided on a base layer formed by electroless plating using Cu, Ti, or the like.

The first inductor wiring 21 includes a first end and a second end which are each located at an outer side portion and which are electrically connected to the first columnar line 31 and the second columnar line 32, respectively, and is curved to form an arch from the first columnar line 31 and the second columnar line 32 toward the central side of the inductor component 1. Furthermore, the first inductor wiring 21 includes pad sections which are located at both ends thereof and which have a width larger than that of spiral-shaped sections. The pad sections are directly connected to the first and second columnar lines 31 and 32.

Likewise, the second inductor wiring 22 includes a first end and a second end which are each located at an outer side portion and which are electrically connected to the third columnar line 33 and the fourth columnar line 34, respectively, and is curved to form an arch from the third columnar line 33 and the fourth columnar line 34 toward the central side of the inductor component 1.

Herein, suppose that, in each of the first and second inductor wirings 21 and 22, a range surrounded by curved lines formed by the first and second inductor wirings 21 and 22 and straight lines connecting both ends of the first and second inductor wirings 21 and 22 is an inside diameter section. In this supposition, when viewed from the Z-direction, the inside diameter sections of the first and second inductor wirings 21 and 22 do not overlap each other and the first and second inductor wirings 21 and 22 are separated from each other.

Furthermore, lines extend from connections between the first and second inductor wirings 21 and 22 and the first to fourth columnar lines 31 to 34 in a direction which is substantially parallel to the X-direction and which is outward the inductor component 1. These lines are exposed to the outside of the inductor component 1. That is, each of the first and second inductor wirings 21 and 22 includes exposed sections 200 exposed to the outside from side surfaces (surfaces substantially parallel to the Y-Z plane) substantially parallel to a lamination direction of the inductor component 1.

These lines are connected to feeder lines used to perform additional electroplating after the formation of the first and second inductor wirings 21 and 22 in the course of manufacturing the inductor component 1. The feeder lines enables additional electroplating to be readily performed on an inductor substrate before being divided into inductor components 1, thereby enabling the interline distance to be reduced. Performing additional electroplating to reduce the distance between the first and second inductor wirings 21 and 22 allows the magnetic coupling between the first and second inductor wirings 21 and 22 to be increased, allows the width of the first and second inductor wirings 21 and 22 to be increased to reduce the electrical resistance, and enables outer dimensions of the inductor component 1 to be reduced.

The first to fourth columnar lines 31 to 34 extend from the first and second inductor wirings 21 and 22 in the Z-direction and penetrate an inner portion of the second magnetic layer 12. The first columnar line 31 extends upward from the upper surface of one end of the first inductor wiring 21 and has an end surface exposed from the first principal surface 10*a* of the element body 10. The second columnar line 32 extends upward from the upper surface of the other end of the first inductor wiring 21 and has an end surface exposed from the first principal surface 10*a* of the element body 10. The third columnar line 33 extends upward from the upper surface of one end of the second inductor wiring 22 and has an end surface exposed from the first principal surface 10*a* of the element body 10. The fourth columnar line 34 extends upward from the upper surface of the other end of the second inductor wiring 22 and has an end surface exposed from the first principal surface 10*a* of the element body 10.

Thus, the first columnar line 31, the second columnar line 32, the third columnar line 33, and the fourth columnar line 34 linearly extend from the first inductor element 2A and the second inductor element 2B to the end surfaces exposed from the first principal surface 10*a* in a direction substantially perpendicular to the end surfaces. This enables the first external terminal 41, the second external terminal 42, the third external terminal 43, and the fourth external terminal 44 to be connected to the first inductor element 2A and the second inductor element 2B at a shorter distance, thereby allowing the inductor component 1 to have low resistance and high inductance. The first to fourth columnar lines 31 to 34 are made of an electrically conductive material and may be made of, for example, substantially the same material as the first and second inductor wirings 21 and 22.

The first to fourth external terminals 41 to 44 are provided on the first principal surface 10*a* of the element body 10. The first to fourth external terminals 41 to 44 are metal films provided on an outer surface of the second magnetic layer 12. The first external terminal 41 is in contact with the end surface of the first columnar line 31 that is exposed from the first principal surface 10*a* of the element body 10 and is electrically connected to the first columnar line 31. This allows the first external terminal 41 to be electrically connected to one end of the first inductor wiring 21. The second external terminal 42 is in contact with the end surface of the second columnar line 32 that is exposed from the first principal surface 10*a* of the element body 10 and is electrically connected to the second columnar line 32. This allows the second external terminal 42 to be electrically connected to the other end of the first inductor wiring 21.

Likewise, the third external terminal 43 is in contact with an end surface of the third columnar line 33, is electrically connected to the third columnar line 33, and is electrically connected to one end of the second inductor wiring 22. The fourth external terminal 44 is in contact with an end surface of the fourth columnar line 34, is electrically connected to the fourth columnar line 34, and is electrically connected to the other end of the second inductor wiring 22.

In the inductor component 1, the first principal surface 10*a* has a first end edge 101 and second end edge 102 which correspond to sides of a rectangle and which extend linearly. The first end edge 101 is an end edge of the first principal surface 10*a* that leads to a first side surface 10*b* of the element body 10. The second end edge 102 is an end edge of the first principal surface 10*a* that leads to a second side surface 10*c* of the element body 10. The first external terminal 41 and the third external terminal 43 are arranged along the first end edge 101, which is on the first side surface 10*b* side of the element body 10. The second external terminal 42 and the fourth external terminal 44 are arranged along the second end edge 102, which is on the second side surface 10*c* side of the element body 10. When viewed from a direction substantially perpendicular to the first principal surface 10*a* of the element body 10, the first side surface 10*b* and second side surface 10*c* of the element body 10 are surfaces along the Y-direction and coincide with the first end edge 101 and the second end edge 102, respectively. A direction in which the first external terminal 41 and the third external terminal 43 are arranged is a direction connecting the center of the first external terminal 41 to the center of the third external terminal 43. A direction in which the second external terminal 42 and the fourth external terminal 44 are arranged is a direction connecting the center of the second external terminal 42 to the center of the fourth external terminal 44.

The insulating film 50 is provided on a portion of the first principal surface 10*a* of the element body 10 that is provided with none of the first to fourth external terminals 41 to 44. The insulating film 50 may overlap the first to fourth external terminals 41 to 44 in the Z-direction such that end portions of the first to fourth external terminals 41 to 44 overlie the insulating film 50. The insulating film 50 is made of, for example, a resin material, such as an acrylic resin, an epoxy resin, or polyimide, having high electrical insulation properties. This enables the insulation between the first to fourth external terminals 41 to 44 to be enhanced. The insulating film 50 serves as a mask when a pattern of the first to fourth external terminals 41 to 44 is formed. This leads to an increase in manufacturing efficiency. When the magnetic metal particles 136 are exposed from the resin 135, the magnetic metal particles 136 can be prevented from being exposed to the outside since the insulating film 50 covers the exposed magnetic metal particles 136. The insulating film 50 may contain filler made of an insulating material such as silica or barium sulfate.

As illustrated in FIG. 2, the first external terminal 41 includes a first metal film 410 provided on the outer surface of the second magnetic layer 12 and a second metal film 411 provided on the first metal film 410. The second, third, and fourth external terminals 42, 43, and 44 have substantially the same configuration as the configuration of the first external terminal 41. Therefore, the first external terminal 41 only is described below.

The first external terminal 41 includes the first metal film 410, which is provided on the outer surface of the second magnetic layer 12, and the second metal film 411, which is provided on the first metal film 410.

The first metal film 410 mainly contains Cu. The first metal film 410 is preferably made of a metal material or alloy containing Cu. This allows the first metal film 410 to have high electrical conductivity. In particular, when the magnetic metal particles 136 contain Fe, the first metal film 410 can be readily formed by plating. This is because Fe contained in the magnetic metal particles 136 and Cu contained in a plating solution induce a substitution reaction to form the first metal film 410.

The second metal film 411 directly covers the first metal film 410 and contains, for example, Ni or the like. The second metal film 411 has a role in suppressing the electrochemical migration and solder erosion of the first metal film 410.

The first external terminal 41 may further include a third metal film provided on the second metal film 411. The third metal film directly covers the second metal film 411, forms the outermost layer of the first external terminal 41, and may be made of, for example, a metal such as Au or Sn. The third metal film has a role in ensuring the wettability of solder.

The second magnetic layer 12 has a contact surface 12*a* in contact with the first metal film 410. At least one of the magnetic metal particles 136 is exposed at the contact surface 12*a*. Thus, the first metal film 410 is provided on the contact surface 12*a* of the second magnetic layer 12 and is in contact with the exposed surfaces of the magnetic metal particles 136 exposed at the contact surface 12*a*.

The first metal film 410 in contact with the exposed surfaces of the magnetic metal particles 136, that is, the first metal film 410 on the exposed surfaces of the magnetic metal particles 136 has a film thickness t of, for example, about 2.9 μm or more.

Since the first metal film 410 has such a film thickness t, a pinhole can be inhibited from occurring in the first metal film 410 on the magnetic metal particles 136 exposed at the contact surface 12*a* of the second magnetic layer 12.

The term "pinhole" as used herein refers to a through-hole formed in the first metal film 410. The through-hole is a hole communicating with the exposed surface of one of the magnetic metal particles 136.

The phrase "film thickness t of about 2.9 μm or more" indicates that at least one of measurements of the film thicknesses t may be about 2.9 μm or more.

When there is a pinhole in the first metal film 410, the magnetic metal particles 136 exposed may possibly be melted in the formation of the second metal film 411. In such a case, the melted magnetic metal particles 136 may possibly affect the second metal film 411. For example, the mixing of the melted magnetic metal particles 136 with the second metal film 411 hardens the second metal film 411, so that the second metal film 411 is likely to crack. However, since the first metal film 410 has such a film thickness t as described above, the occurrence of a pinhole in the first metal film 410 can be suppressed and the melting of the exposed magnetic metal particles 136 can be suppressed, thereby enabling the cracking of the second metal film 411 to be suppressed. Since the melting of the exposed magnetic metal particles 136 can be suppressed, the reduction in content of the magnetic metal particles 136 contained in the second magnetic layer 12 can be suppressed and the reduction in inductance of the electronic component can be suppressed. Thus, since the first metal film 410 has such a film thickness t as described above, the influence of a pinhole on the performance of the electronic component can be suppressed.

As described above, the present disclosure has been made to solve a newly found problem. In particular, in a known technique, cracks may possibly occur in part of a metal film as described above. The inventors have performed intensive investigations and, as a result, have found that the above cracks are caused by the hardening of the second metal film 411 and the hardening of the second metal film 411 is caused by the fact that the melted magnetic metal particles 136 mix with the second metal film 411 through pinholes occurring in the first metal film 410. In order to solve the above problem, the inventors have reached the configuration of the present disclosure for the purpose of suppressing the occurrence of pinholes in the first metal film 410.

The phrase "film thickness t of the first metal film 410 on the magnetic metal particles 136" refers to the thickness of the first metal film 410 in a direction substantially perpendicular to the outer surface of the second magnetic layer 12 on which the first metal film 410 is provided. The film thickness t of the first metal film 410 on the magnetic metal particles 136 is a value determined from a FIB-SIM image of a cross section of the inductor component 1. The FIB-SIM image is a cross-sectional image observed with a scanning ion microscope (SIM) using a focused ion beam (FIB). An image can be analyzed using image-processing software (for example, A-zo-kun® developed by Asahi Kasei Engineering Corporation).

The cross section is one set to pass through the centerlines of the first and second columnar lines 31 and 32 of the inductor component 1 as illustrated in FIG. 1B. In this case, the film thickness t of the first metal film 410 on the magnetic metal particles 136 can be obtained by measuring a predetermined range in a place in which the first metal film 410 is provided on the second magnetic layer 12. The predetermined range is, for example, a central region of the cross section that is located between the first columnar line 31 and the insulating film 50. In particular, the predetermined range is a region which is 40 μm or more apart from an end portion of the first columnar line 31 that is located on the insulating film 50 side and which is 70 μm or more apart from an end portion of the insulating film 50 that is located on the first columnar line 31 side.

As described above, the lower limit of the film thickness t of the first metal film 410 on the magnetic metal particles 136 is 2.9 μm. This is described in detail with reference to FIG. 4. The present disclosure is not restricted to theory below.

Figure 4:
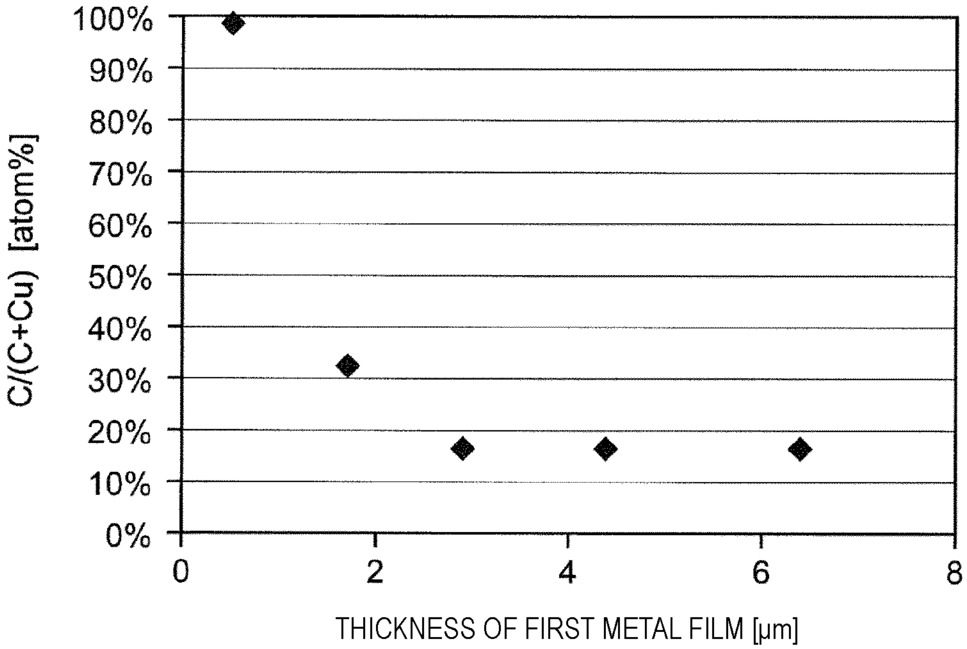
FIG. 4 is a graph showing the relationship between the film thickness of a first metal film and the ratio of the number of carbon atoms to the sum of the number of the carbon atoms and the number of Cu atoms forming the first metal film.

FIG. 4 is a graph in which the horizontal axis represents the film thickness t of the first metal film 410 (the film thickness of Cu in FIG. 4) and the vertical axis represents the ratio of the number of carbon atoms to the sum of the number of the carbon atoms and the number of metal atoms (Cu atoms in FIG. 4) forming the first metal film 410 and which is one determined as described below.

The magnetic metal particles 136 used were those containing Fe. A measurement sample including the second magnetic layer 12 and the first metal film 410 formed thereon was dipped in a chemical solution (a resin-containing solution prepared by adding sulfuric acid serving as an etching accelerator to an acrylic resin (marketed by ZEON Corporation under the trade name Nipol LX814A) serving as a resin component for the purpose of adjusting the pH and further adding NEWREX® (available from NOF Corporation) serving as a surfactant to the acrylic resin) reacting with Fe to form a film containing carbon. After the measurement sample was taken out of the chemical solution, the measurement sample was heat-treated at 210° C. for 0.5 h and was measured for the percentage of carbon atoms present on the first metal film 410 by energy dispersive X-ray spectroscopy (SEM-EDX).

That is, when a pinhole is present in the first metal film 410 on the magnetic metal particles 136, Fe contained in the magnetic metal particles 136 exposed at a surface of the second magnetic layer 12 reacts with the chemical solution through the pinhole, whereby a carbon film is formed on the exposed surfaces of the magnetic metal particles 136. Thus, when a large number of pinholes are present, a large amount of Fe is exposed through the pinholes. When a large amount of Fe is present, the ratio of the number of carbon atoms having reacted with Fe to the sum of the number of the carbon atoms and the number of metal atoms forming the first metal film 410 is high.

As shown in FIG. 4, when the film thickness t of the first metal film 410 is small, the above ratio is high. However, when the film thickness t of the first metal film 410 is large, the above ratio is low. This suggests that the increase in the film thickness t of the first metal film 410 reduces the number of pinholes in the first metal film 410 on the magnetic metal particles 136. Furthermore, as shown in FIG. 4, when the film thickness t of the first metal film 410 is about 2.9 μm or more, the above ratio is substantially constant. This result suggests that, when the film thickness t of the first metal film 410 is about 2.9 μm or more, no pinhole is present in the first metal film 410 on the magnetic metal particles 136. Referring to FIG. 4, when the film thickness t of the first metal film 410 is about 2.9 μm or more, the ratio of the number of the carbon atoms having reacted with Fe to the sum of the number of the carbon atoms and the number of the metal atoms forming the first metal film 410 exhibits a constant value. This is probably because the chemical solution reacts with Fe in the first metal film 410 to form a carbon film.

FIG. 4 shows results obtained by investigating a case where the magnetic metal particles 136 contain Fe. Even in a case where another material, for example, another metal material is used, if the film thickness t of the first metal film 410 is less than about 2.9 μm, then pinholes probably occur.

The first metal film 410 on the exposed surfaces of the magnetic metal particles 136 preferably has a film thickness t of about 15 μm or less. Such a film thickness t enables the first metal film 410 to be prevented from having excessively high resistance.

Two or more of the magnetic metal particles 136 are preferably exposed at the contact surface **12*a*. In this case, the distance between a first magnetic metal particle 136 and a second magnetic metal particle 136 which are two of the magnetic metal particles 136 exposed at the contact surface 12*a* and which are adjacent to each other is preferably less than or equal to about twice a film thickness of at least one of the film thickness t of the first metal film 410 on the first magnetic metal particle 136 and the film thickness t of the first metal film 410 on the second magnetic metal particle 136**.

When the distance between the magnetic metal particles 136 is such a value as described above, pinholes are more unlikely to occur in the first metal film 410 on the magnetic metal particles 136 exposed at the contact surface **12*a* of the second magnetic layer 12. Furthermore, according to the above mode, most of spaces between the magnetic metal particles 136 (and surroundings thereof) can be covered with the first metal film 410. As a result, the first metal film 410 can be formed on the second magnetic layer 12 so as to be smoother. Furthermore, the second metal film 411 can also be formed on the first metal film 410** so as to be smooth.

Herein, the distance between the exposed magnetic metal particles 136 can be determined from a FIB-SIM image of a cross section in substantially the same manner as that used to measure the film thickness t of the first metal film 410 on the magnetic metal particles 136 as described above.

The distance between the first magnetic metal particle 136 and the second magnetic metal particle 136, which are exposed from the contact surface **12*a* and adjacent to each other, is more preferably less than or equal to about twice a film thickness that is a smaller one of the film thickness t of the first metal film 410 on the first magnetic metal particle 136 and the film thickness t of the first metal film 410 on the second magnetic metal particle 136**.

When the distance between the neighboring magnetic metal particles 136 is within the above range, the first metal film 410 can be formed so as to be further smoother.

The average film thickness of the first metal film 410 is preferably 2.9 μm or more and is, for example, 5 μm or more. Such an average film thickness allows pinholes to be more unlikely to occur in the first metal film 410 on the magnetic metal particles 136 exposed at the contact surface **12*a* of the second magnetic layer 12**.

The phrase "average film thickness of the first metal film 410" as used herein refers to the average film thickness of the first metal film 410 on the second magnetic layer 12, that is, the average film thickness of the first metal film 410 on the resin 135 and the magnetic metal particles 136. The average film thickness of the first metal film 410 can be measured from substantially the same cross section as that used to measure the film thickness t of the first metal film 410 on the magnetic metal particles 136.

The average film thickness of the first metal film 410 is, for example, the arithmetic average of values determined from a FIB-SIM image of a cross section of the inductor component 1 and, in particular, may be the average of ten measurements.

In 95% or more of the exposed magnetic metal particles 136, the distance between the neighboring magnetic metal particles 136 is preferably less than or equal to about twice the average film thickness of the first metal film 410. In 100% of the exposed magnetic metal particles 136, the distance between the neighboring magnetic metal particles 136 may be less than or equal to about twice the average film thickness of the first metal film 410. In this case, the average film thickness of the first metal film 410 may be about 5 μm or more.

Herein, the distance between the neighboring magnetic metal particles 136 is a value measured in a region used to measure the average film thickness and, in particular, is the measurements for ten of the magnetic metal particles 136 used to measure the average film thickness.

Such a configuration as described above enables pinholes to be more unlikely to occur in the first metal film 410 on the magnetic metal particles 136. As a result, variations in resistance are more unlikely to occur in the first metal film 410.

Manufacturing Method

Next, a method for manufacturing the inductor component 1 is described.

Figure 3A:
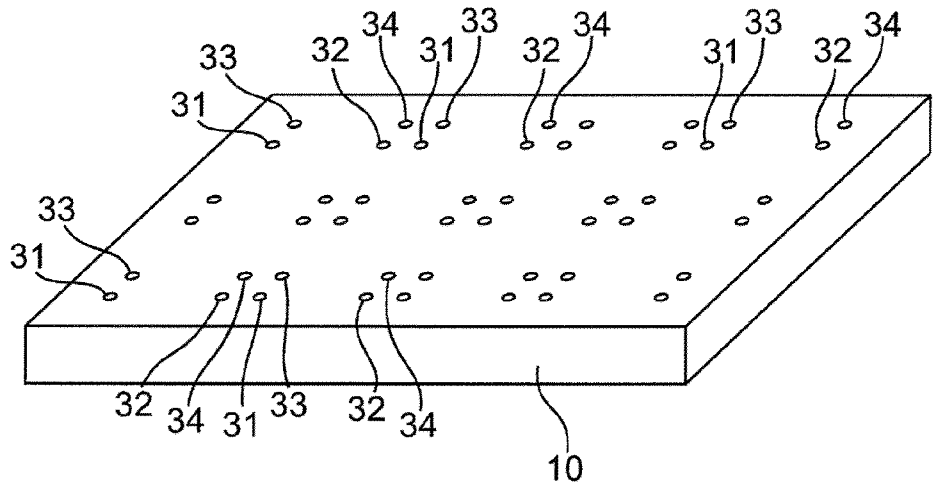
FIG. 3A is an illustration of a method for manufacturing the inductor component.
Figure 3B:
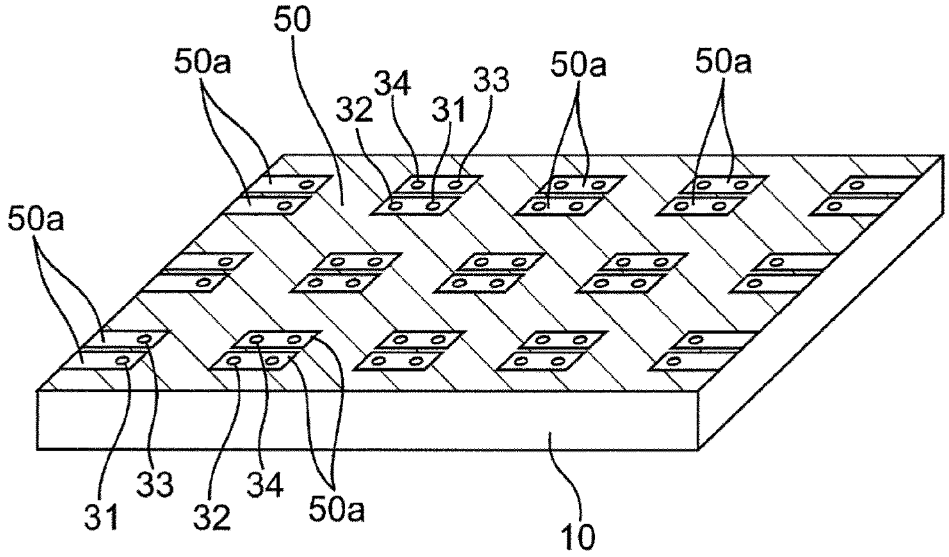
FIG. 3B is an illustration of the method for manufacturing the inductor component.

As illustrated in FIG. 3A, an upper surface of an element body 10 is ground by polishing or the like in such a state that a plurality of inductor wirings 21 and 22 and a plurality of columnar lines 31 to 34 are covered by the element body 10, whereby end surfaces of the columnar lines 31 to 34 are exposed from the upper surface of the element body 10. Thereafter, as illustrated in FIG. 3B, an insulating film 50, which is marked by hatching, is formed over the upper surface of the element body 10 by a coating method such as spin coating or screen printing, a dry method such as dry film resist lamination, or the like. The insulating film 50 is, for example, a photoresist film.

Thereafter, in a region for forming external terminals, the insulating film 50 is removed by photolithography, laser, drilling, blasting, or the like, whereby through-holes 50*a* are formed in the insulating film 50 such that end surfaces of the columnar lines 31 to 34 and part of the element body 10 (second magnetic layer 12) are exposed through the through-holes 50*a*. In this operation, as illustrated in FIG. 3B, the end surfaces of the columnar lines 31 to 34 may be entirely exposed from the through-holes 50*a* or may be partly exposed from the through-holes 50*a*. Alternatively, some of the end surfaces of the columnar lines 31 to 34 may be exposed from one of the through-holes 50*a*.

Figure 3C:
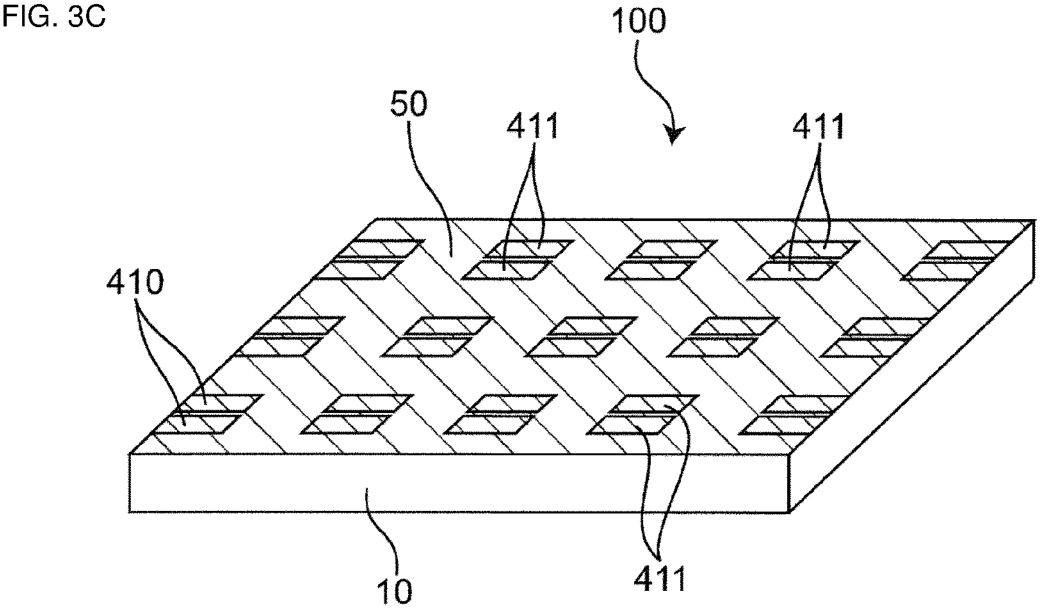
FIG. 3C is an illustration of the method for manufacturing the inductor component.
Figure 3D:
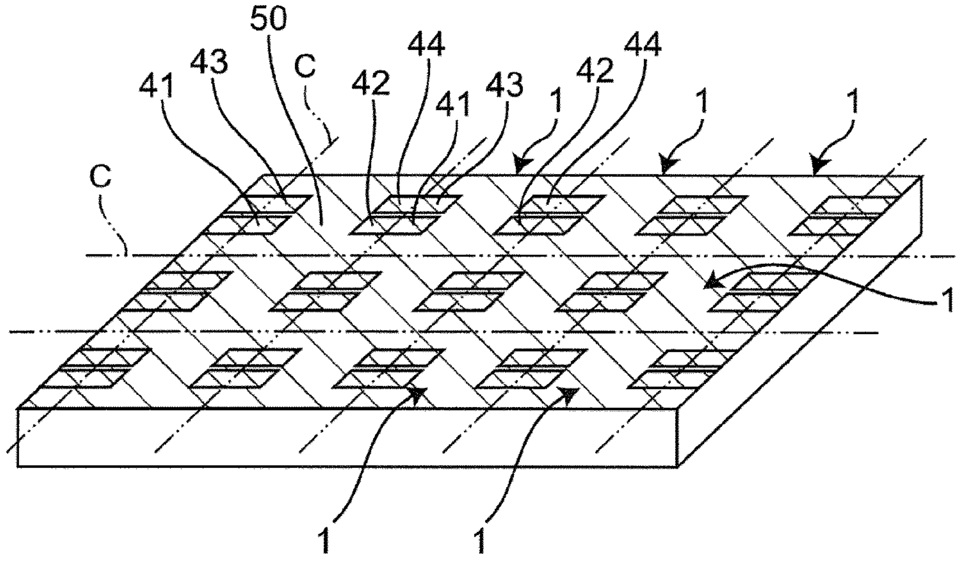
FIG. 3D is an illustration of the method for manufacturing the inductor component.

Thereafter, as illustrated in FIG. 3C, a first metal film 410 is formed in the through-holes 50*a* by a method described below and a second metal film 411 is formed on the first metal film 410, whereby a mother substrate 100 is configured. The first metal film 410 and the second metal film 411 form external terminals 41 to 44 before being cut. Thereafter, as illustrated in FIG. 3D, the mother substrate 100, that is, the sealed inductor wirings 21 and 22 are diced into pieces for each pair of the inductor wirings 21 and 22 along cutting lines C using a dicing blade or the like, whereby a plurality of inductor components 1 are manufactured. The first metal film 410 and the second metal film 411 are cut along the cutting lines C, whereby the external terminals 41 to 44 are formed. The external terminals 41 to 44 may be prepared in such a manner that the first metal film 410 and the second metal film 411 are cut by such a method as described above or in such a manner that after the insulating film 50 is removed in advance so that the through-holes 50*a* have substantially the same shape as that of the external terminals 41 to 44, the first metal film 410 and the second metal film 411 are formed.

Furthermore, a third metal film may be provided on the second metal film 411. In this case, the first metal film 410, the second metal film 411, and the third metal film form the external terminals 41 to 44 before being cut. In the description of FIG. 3C, the phrase "first metal film 410 and second metal film 411" is replaced with the phrase "first metal film 410, second metal film 411, and third metal film".

Method for Forming First Metal Film 410

A method for forming the above-mentioned first metal film 410 is described.

As described above, in such a state that the through-holes 50*a* have been formed in the insulating film 50, end surfaces of the columnar lines 31 to 34 and the element body 10 are exposed from the through-holes 50*a*. The first metal film 410, which is in contact with the element body 10 and is electrically conductive, is formed on the end surface of the columnar lines 31 to 34 that are exposed from the through-holes 50*a* and the upper surface of the element body 10 by electroless plating. The first metal film 410 is a layer containing, for example, Cu.

In particular, the first metal film 410, which contains Cu, is precipitated on the magnetic metal particles 136, which contain Fe, by electroless plating. In detail, the magnetic metal particles 136 exposed at the contact surface 12*a* of the second magnetic layer 12 that is in contact with the first metal film 410 function as a catalyst. Metal (for example, Fe) contained in the magnetic metal particles 136 and metal (for example, Cu) used to form the first metal film 410 induce a substitution reaction. As a result, the first metal film 410 is formed on the magnetic metal particles 136.

Thereafter, the first metal film 410 precipitated on the magnetic metal particles 136 is grown, whereby the first metal film 410 is formed on the resin 135 in the second magnetic layer 12. Thereafter, a reducing agent contained in a plating solution decomposes to release electrons and the electrons are supplied to Cu ions in the plating solution, so that a reduction reaction proceeds. In this manner, the first metal film 410 is formed so as to have a film thickness t of about 2.9 μm or more.

In electroless plating, the reducing agent used may preferably be, for example, formaldehyde. The plating solution may contain a complexing agent such as a Rochelle salt or ethylenediaminetetraacetic acid (EDTA). In the method according to the present disclosure, before plating is performed using the plating solution, plating pretreatment may be performed using a plating pretreatment solution. The plating pretreatment solution contains no catalyst (for example, a Sn—Pd catalyst or the like).

In order to form the first metal film 410 on the columnar lines (Cu) 31 to 34, for example, the first metal film 410 precipitated on the magnetic metal particles 136 may be grown so as to extend on the columnar lines 31 to 34. Alternatively, a Pd layer, that is, a catalyst layer is formed on the columnar lines 31 to 34, and the first metal film 410 may be formed on the catalyst layer by electroless plating.

Method for Forming Second Metal Film 411

The second metal film 411 is not particularly limited and may be formed by, for example, plating. In the present disclosure, the magnetic metal particles 136 can be protected with the first metal film 410 as described above. As a result, the magnetic metal particles 136 can be prevented from being melted when plating is performed for the purpose of forming the second metal film 411. For example, the mixing of the melted magnetic metal particles 136 with the second metal film 411 may possibly affect the second metal film 411. For example, the second metal film 411 may possibly be likely to crack because of the mixing of the melted magnetic metal particles 136 with the second metal film 411. However, in the present disclosure, the melting of the magnetic metal particles 136 can be suppressed and therefore the above problem is unlikely to occur. Furthermore, the contamination of the plating solution can be prevented and the sticking of the plating solution can be prevented.

Second Embodiment

Figure 5:
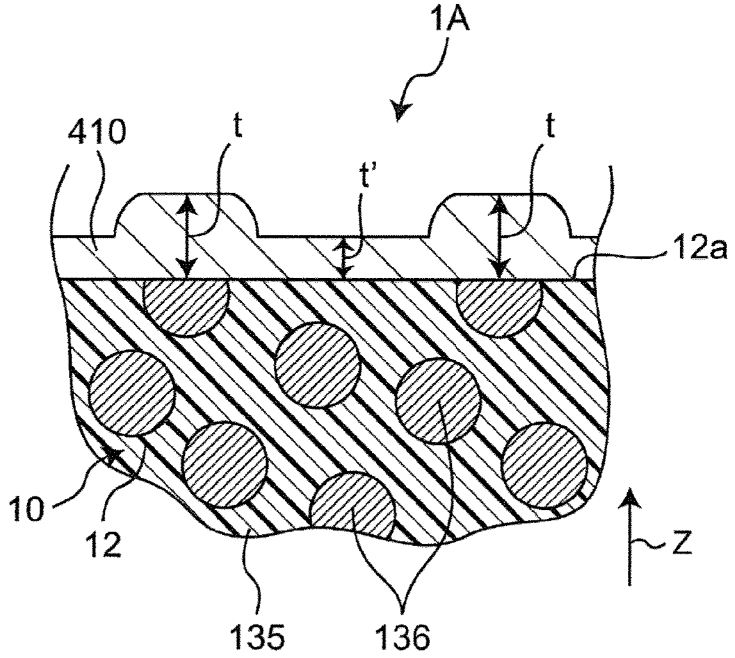
FIG. 5 is a partly enlarged view of an electronic component according to a second embodiment.

FIG. 5 is a partly enlarged view illustrating a second magnetic layer 12 and a first metal film 410 in an electronic component 1A according to a second embodiment. The second embodiment differs in the film thickness of the first metal film 410 from the first embodiment. This difference is described below. Other components are substantially the same as those in the first embodiment, are given the same reference numerals as those in the first embodiment, and will not be described in detail.

As illustrated in FIG. 5, in the second embodiment, the first metal film 410 has a surface irregular structure unlike a configuration according to the first embodiment in which the whole of the first metal film 410 has a smooth structure. In FIG. 5, a second metal film 411 is omitted.

In particular, the film thickness t of the first metal film 410 on magnetic metal particles 136 exposed at a contact surface 12*a* is about 2.9 μm or more and the film thickness t' of the first metal film 410 on resin 135 at the contact surface 12*a* is less than the film thickness t of the first metal film 410. Since the film thickness t of the first metal film 410 on the magnetic metal particles 136 is about 2.9 μm or more as described above, the occurrence of pinholes can be suppressed even if the film thickness t' of the first metal film 410 on the resin 135 is small.

The film thicknesses t of portions of the first metal film 410 on the magnetic metal particles 136 may be different from each other and the film thickness t of at least one of the portions may be about 2.9 μm or more. All the film thicknesses t of the portions of the first metal film 410 on the magnetic metal particles 136 are preferably about 2.9 μm or more.

The present disclosure is not limited to the above-mentioned embodiments and can be modified without departing from the scope of the present disclosure.

In the above embodiments, two inductor elements, that is, the first inductor element 2A and the second inductor element 2B are provided in the element body 10. Three or more inductor elements may be provided in the element body 10. In this case, the number of external terminals and the number of columnar lines are six or more.

In the above embodiments, the number of turns of the inductor wirings in the inductor elements is less than one. The number of turns of the inductor wirings may be more than one and the inductor wirings may be curved lines. The number of layers containing inductor wirings included in the inductor element is not limited to one and a multilayer structure including two or more layers may be used. The first inductor wiring of the first inductor element and the second inductor wiring of the second inductor element are not limited to a configuration in which the first and second inductor wirings are provided on the same plane substantially parallel to the first principal surface. The first and second inductor wirings may be arranged in a direction substantially perpendicular to the first principal surface.

A "inductor wiring" is to one that causes inductance in an inductor component by generating magnetic flux when a current flows and the structure, shape, and material thereof are not particularly limited. For example, known wirings, such as meander wirings, having various shapes can be used.

In the above embodiments, the first metal film 410 and the second metal film 411 are used as external terminals of the inductor component. The first metal film 410 and the second metal film 411 are not limited to this use and may be, for example, internal terminals of the inductor component. The first metal film 410 and the second metal film 411 are not limited to being used in inductor components and may be used in other electronic components such as capacitor components and resistor components. The first metal film 410 and the second metal film 411 may be applied to a circuit board equipped with such electronic components. The first metal film 410 and the second metal film 411 may be, for example, wiring patterns for circuit boards.

In the above embodiments, the first metal film 410 and the second metal film 411 are used for external terminals. The first metal film 410 and the second metal film 411 may be used for inductor wirings. That is, a composite body may be used instead of a substrate in such a manner that inductor wirings are formed as metal films on the composite body by electroless plating. This enables metal films which serve as inductor wirings and which have the above-mentioned effect to be obtained and enables the metal films to be formed as the above-mentioned effect is exhibited.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:

a composite body containing resin and magnetic metal particles;

a first metal film provided on an outer surface of the composite body; and a second metal film provided on the first metal film, wherein at least one of the magnetic metal particles is exposed at a contact surface of the composite body that is in contact with the first metal film, the first metal film is in contact with an exposed surface of the at least one of the magnetic metal particles exposed from the contact surface of the composite body, a film thickness of the first metal film on the exposed surface of the at least one of the magnetic metal particles is 2.9 μm or greater, two or more of the magnetic metal particles being a first magnetic metal particle and a second magnetic metal particle are exposed at the contact surface of the composite body, and a distance between the first magnetic metal particle and the second magnetic metal particle that are adjacent to each other is less than or equal to twice the film thickness of the first metal film on the first magnetic metal particle.

2. The electronic component according to claim 1, wherein the film thickness of the first metal film on the exposed surface is 15 μm or less.

3. The electronic component according to claim 2, wherein an average film thickness of the first metal film is 2.9 μm or greater.

4. The electronic component according to claim 2, wherein an average film thickness of the first metal film is 5 μm or greater.

5. The electronic component according to claim 2, wherein the magnetic metal particles contain Fe.

6. The electronic component according to claim 2, wherein the first metal film contains Cu.

7. The electronic component according to claim 2, wherein the second metal film contains Ni.

8. The electronic component according to claim 1, wherein the distance between the first magnetic metal particle and the second magnetic metal particle is less than or equal to twice a film thickness that is smaller one of the film thickness of the first metal film on the first magnetic metal particle and a film thickness of the first metal film on the second magnetic metal particle.

9. The electronic component according to claim 8, wherein two or more of the magnetic metal particles are exposed at the contact surface of the composite body and, in 95% or more of the magnetic metal particles exposed, a distance between the magnetic metal particles adjacent to each other is less than or equal to twice an average film thickness of the first metal film.

10. The electronic component according to claim 1, wherein an average film thickness of the first metal film is 2.9 μm or greater.

11. The electronic component according to claim 10, wherein two or more of the magnetic metal particles are exposed at the contact surface of the composite body and, in 95% or more of the magnetic metal particles exposed, a distance between the magnetic metal particles adjacent to each other is less than or equal to twice an average film thickness of the first metal film.

12. The electronic component according to claim 1, wherein an average film thickness of the first metal film is 5 μm or greater.

13. The electronic component according to claim 1, wherein the magnetic metal particles contain Fe.

14. The electronic component according to claim 1, wherein the first metal film contains Cu.

15. The electronic component according to claim 1, wherein the second metal film contains Ni.

16. The electronic component according to claim 1, further comprising:

a third metal film which is provided on the second metal film and which has solder wettability.

17. The electronic component according to claim 1, further comprising:

an inductor wiring provided in the composite body, wherein the first metal film and the second metal film define an external terminal electrically connected to the inductor wiring.

18. An electronic component comprising:

a composite body containing resin and magnetic metal particles;

a first metal film provided on an outer surface of the composite body; and a second metal film provided on the first metal film, wherein at least one of the magnetic metal particles is exposed at a contact surface of the composite body that is in contact with the first metal film, the first metal film is in contact with an exposed surface of the at least one of the magnetic metal particles exposed from the contact surface of the composite body, a film thickness of the first metal film on the exposed surface of the at least one of the magnetic metal particles is 2.9 μm or greater, an average film thickness of the first metal film is 2.9 μm or greater, two or more of the magnetic metal particles are exposed at the contact surface of the composite body and, in 95% or more of the magnetic metal particles exposed, a distance between the magnetic metal particles adjacent to each other is less than or equal to twice an average film thickness of the first metal film.

* * * * *